June 13, 1950 P. B. MURPHY 2,511,121

METHOD OF RECORDING INFORMATION ON STATIONARY MAGNETIC MATERIAL

Filed Feb. 14, 1948 2 Sheets-Sheet 1

INVENTOR
P. B. MURPHY
BY J. W. Schmied
ATTORNEY

June 13, 1950

P. B. MURPHY

METHOD OF RECORDING INFORMATION ON STATIONARY MAGNETIC MATERIAL 2,511,121

Filed Feb. 14, 1948

2 Sheets-Sheet 2

INVENTOR
P. B. MURPHY
BY
J. W. Schmied
ATTORNEY

Patented June 13, 1950 2,511,121

UNITED STATES PATENT OFFICE 2,511,121

METHOD OF RECORDING INFORMATION ON STATIONARY MAGNETIC MATERIAL

Paul B. Murphy, South Nyack, N. Y., assignor to Bell Telephone Laboratories, Incorporated, New York, N. Y., a corporation of New York Application February 14, 1948, Serial No. 8,485

10 Claims. (Cl. 346—74)

This invention pertains to a method of and apparatus for magnetic recording and more particularly to a method of and apparatus for recording information on stationary magnetic material.

The usual method of recording information on magnetic material involves passing a steel tape at a suitable speed past the poles of a recording electromagnet and varying the magnetic field of the electromagnet to correspond to the signal to be recorded. When such a method is employed to record information which is presented at irregular or widely spaced intervals, a considerable length of tape is required to record the information or the recording apparatus must be stopped between the intervals. The former method is wasteful of tape, and the latter introduces rather complex problems such as accelerating the tape quickly enough to pass the recording magnet at the proper uniform speed.

Figure 1:
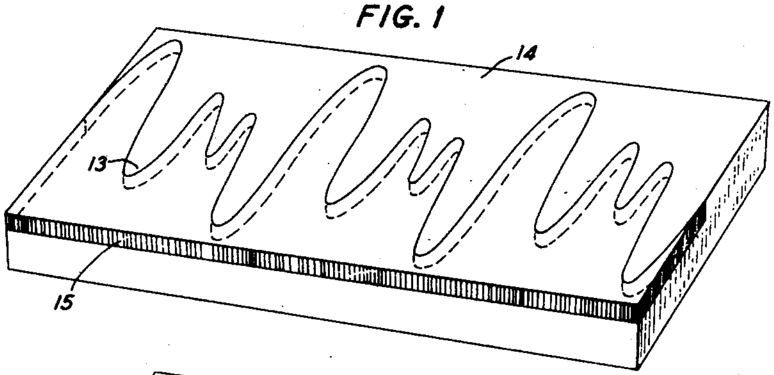
Figure 2:
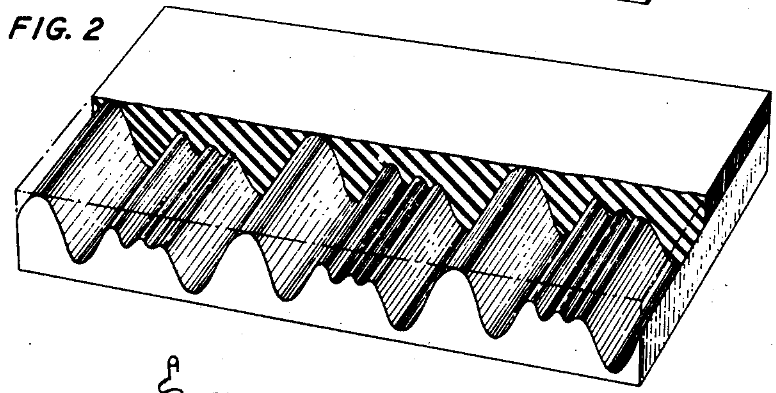
Figures 3, 4:
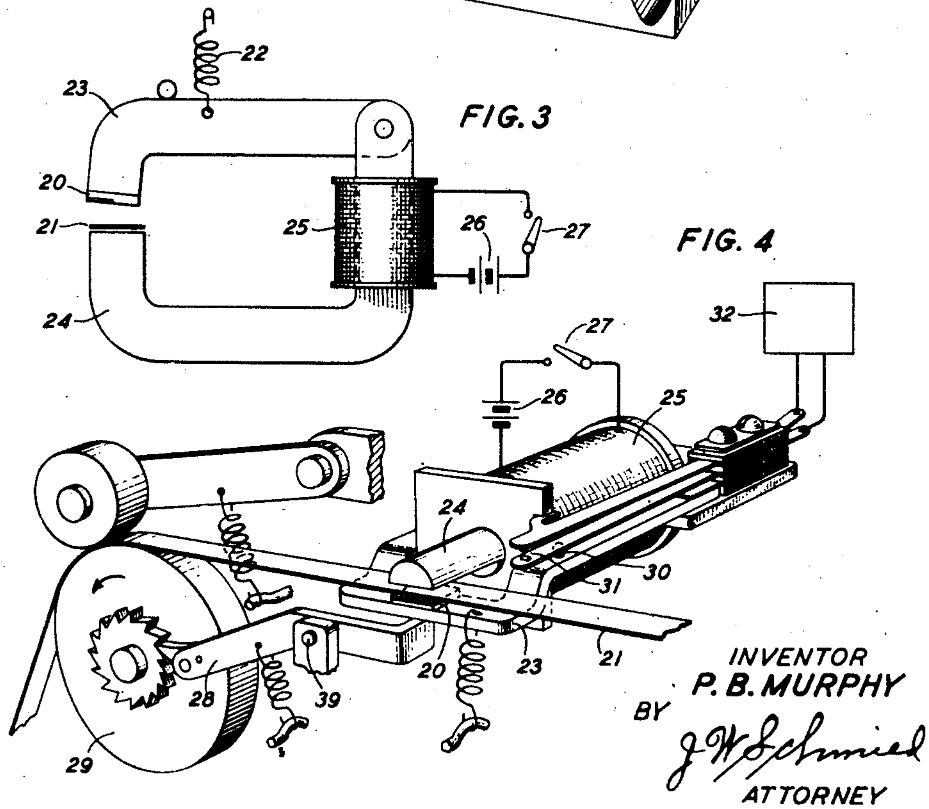
Figures 5, 6:
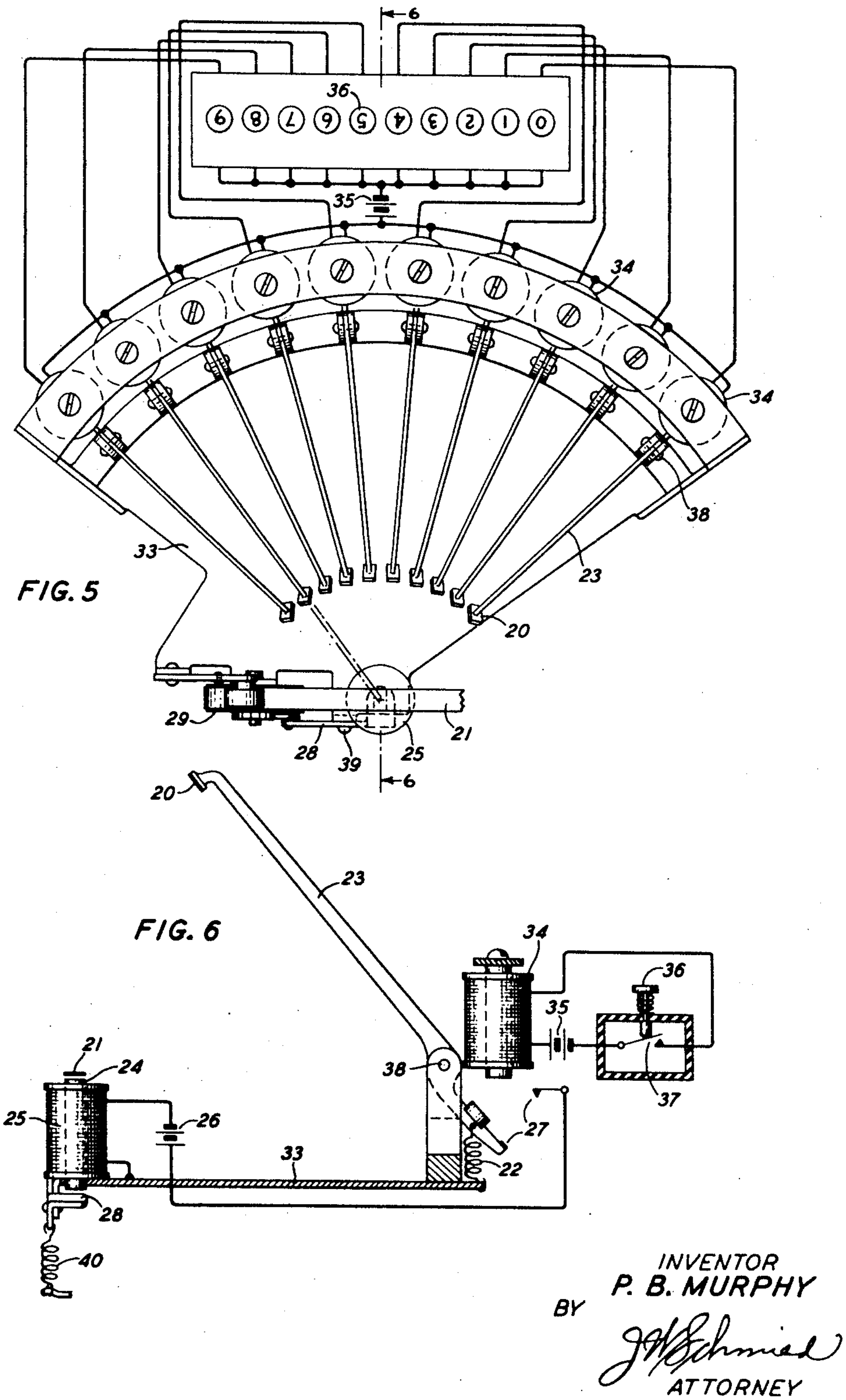

An object of this invention is to provide a method of and apparatus for recording information on magnetic material wherein the magnetic material is stationary while the information is being recorded. This and other objects of the invention will be apparent from the following description, the appended claims, and the drawings, in which:

Fig. 1 indicates a raised pattern in magnetic material representing the information to be recorded;

Fig. 2 indicates an alternative form of the raised pattern indicated in Fig. 1;

Fig. 3 indicates one type of apparatus for reproducing the information represented on a raised pattern;

Fig. 4 is an oblique view of a relay adapted to reproduce the information represented on a raised pattern;

Fig. 5 indicates apparatus for the selective reproduction of the information recorded on ten raised patterns; and Fig. 6 is a sectional view of the apparatus indicated in Fig. 5.

In telephone systems it is common practice to transmit, register, or record digits on a two frequency out of five basis, wherein five frequencies within the voice frequency range are selected as a basis and each of the ten digits is represented by a different combination of two of the five frequencies. The invention disclosed herein is adapted to magnetically record these frequency combinations on a stationary magnetic material and employs representations of the frequency combinations in the form of raised patterns on magnetic material as disclosed in Figs. 1 and 2.

Referring to Fig. 1, the wave form representing the frequency combinations to be recorded is represented by a series of ridges 13 in magnetic material 14, the ridges corresponding in shape and amplitude to the configuration of the complex wave pattern. The wave pattern to be impressed in the magnetic material may be determined mathematically or by the use of apparatus for recording sound on film. In either method the representation of the wave pattern to be impressed in the magnetic material corresponds to the variable area method of recording sound on film. Using conventional apparatus for recording sound on film by the variable area method, two alternating current signals representing the frequency combination to be recorded are applied to the input of the apparatus and a conventional sound track is produced which represents the desired variable area wave pattern. The wave pattern may be transferred to the magnetic material in various ways such as molding, die sinking, or etching. In one method of etching a representation of the frequency combination, the wave form is recorded on film by the conventional variable area method, the face of a magnetic material whose width corresponds to the sound track of the film is coated with bichromated gelatine which has not been exposed to light, the sound track on the film is placed over the bichromated gelatine coating, and this combination is exposed to light so that light is permitted to strike the bichromated gelatine only in an area corresponding to the transparent area of the sound track. The bichromated gelatine coating which is thereby exposed to light hardens and becomes waterproof, whereas the unexposed gelatine remains soluble in water. The gelatine coating is now washed with water so as to expose the surface on the magnetic material which is to be etched. A suitable etching acid, such as hydrochloric, is applied to the face of the magnetic material and the hardened gelatine coating which remains, and the etching action which results serves to depress only the area of the magnetic material which is not coated with hardened gelatine so that the etched surface forms a depressed area, leaving a raised pattern corresponding to the surface which is covered with gelatine. This depressed area should be of constant depth and should be about two-thousandths of an inch or more below the raised pattern. For greater depths less uniformity in the depth of the depressed area is required. The depressed area is filled with a non-magnetic material 15 such as plastic so that the resulting face is smooth and flush with the raised pattern. Magnetic material 14 is formed of a material, such as soft iron, which offers a path of high permeability to a magnetic field.

An alternative method of forming a wave pattern in magnetic material is the formation of a raised pattern wherein a representation of the wave form comprises a series of transverse ridges impressed in relief on the magnetic material as shown in Fig. 2. This method is more involved than the previous method because the configuration of the relief pattern must be determined experimentally.

Reference may be had to Patent 1,941,036, granted to Wilhelm Lenk on October 15, 1931, for a disclosure as to the formation of representations of frequency combinations in magnetic material.

In order to magnetically reproduce the frequency combinations which are represented by the above-described raised patterns, the raised pattern is cut to a length corresponding to the number of cycles of the frequency combination which it is desired to reproduce and this raised pattern is placed in contact with a magnetic recording material, such as steel tape, which will retain a substantial amount of magnetism after being exposed to a magnetic field, and this combination is exposed to a strong magnetic field. The magnetic flux density in the recording material will be a maximum over the area where the magnetic material of the raised pattern is in contact with the recording material, and the flux density over the remainder of the area covered by the pattern will vary inversely as the square of the distance between the magnetic material of the pattern and the recording material. When the magnetic field is removed, the magnetic pattern which the recording material retains is of maximum flux density in the area which corresponds to the configuration of the raised pattern and is therefore a magnetic representation of the complex wave form of the frequency combination under consideration.

Fig. 3 indicates, in schematic form, a method of producing a magnetic pattern on a steel tape from the raised patterns. When the apparatus is in an idle condition, switch 27 is open and soft iron armature 23 is suspended by spring 22. Raised pattern 20 is attached to the face of armature 23, and tape 21 is inserted between the frequency pattern and soft iron pole-piece 24. Armature 23, pole-piece 24, and raised pattern 20 comprise a magnetic path of high permeability. When switch 27 is closed, winding 25 is energized from battery 26, and pole-piece 24 and armature 23 are magnetized. The magnetic attraction across the air-gap between the raised pattern and the pole-piece causes armature 23 to move downward and clamp steel tape 21 between raised pattern 20 and pole-piece 24. A momentary closure of switch 27 is sufficient to reproduce a representation of the frequency combinations on steel tape 21, and the density of the magnetic pattern produced is controlled by the ampere turns employed to magnetize pole-piece 24.

Fig. 4 indicates a relay structure adapted to magnetically reproduce the frequency combinations as represented by the raised patterns. As before, pole-piece 24, armature 23, and raised pattern 20 comprise a magnetic path of high permeability. Initially, armature 23 is released and steel tape 21 is at rest. When switch 27 is closed, winding 25 is energized from battery 26, and armature 23 moves upward and clamps tape 21 between raised pattern 20 and pole-piece 24. As armature 23 moves upward, stepping pawl 28 rotates in a counter-clockwise direction about pivot 39, and ratchet wheel 29 is not rotated. A magnetic pattern representing the frequency combination is established in the tape; and when switch 27 is opened, armature 23 is released, stepping pawl 28 is rotated in a clockwise direction about pivot 39 so as to engage a tooth on ratchet wheel 29, and the ratchet wheel is rotated in a counter-clockwise direction a sufficient distance to remove from the relay structure the portion of tape 21 bearing the recording. Each time armature 23 operates, protrusion 30 causes contacts 31 to close and thereby short the connectors leading to telephone apparatus 32. Thus, it is apparent that the apparatus disclosed is adapted to make a magnetic recording of a representation of a frequency combination and is adapted to operate contacts associated with the relay each time the relay winding is energized. It will be observed that the apparatus is particularly adapted for use in telephone systems where it is desired to record the operation of certain relays which perform specific functions within the telephone system.

Figs. 5 and 6 disclose apparatus adapted to record magnetic representations of the digits 0 to 9. As before, pole-piece 24, armature 23, and raised pattern 20 form a magnetic path of high permeability. Soft iron supporting structure 33 serves to complete the magnetic path. Initially, tape 21 is at rest and armature 23 is suspended by spring 22. When push-button 36 is pressed, contacts 37 close, the winding of electromagnet 34 is energized by battery 35, armature 23 is attracted by the pole-piece of electromagnet 34, raised pattern 20 is moved downward so that it clamps tape 21 to pole-piece 24, contacts 27 are closed, and winding 25 is energized by battery 26. When winding 25 is energized, the magnetic field thereby generated serves to attract stepping pawl 28 so that it is rotated in a counter-clockwise direction about pivot 39. The magnetic flux flowing through the high permeability path made up of pole piece 24, supporting framework 33, armature 23, raised pattern 20, and tape 21 establishes a magnetic pattern in the tape which represents the frequency combination assigned to the digit represented by key 36. When the key is released, contacts 37 open, the winding of electromagnet 34 is deenergized, armature 23 is suspended by spring 22, contacts 27 open, winding 25 is deenergized, stepping pawl 28 is rotated in a clockwise direction about pivot 39 by spring 40 so as to engage a tooth on ratchet wheel 29, and tape 21 is stepped by the ratchet wheel. The tension on spring 22 is adjusted so that armature 23 is allowed to rotate and clamp tape 21 between raised pattern 20 and pole-piece 24 when electromagnet 34 is energized and so that the magnetic attraction of pole-piece 24 is insufficient to hold armature 23 operated when electromagnet 34 is deenergized. Each armature is pivoted about an axis 38 in such manner that each raised pattern strikes the tape at a point exactly over pole-piece 24.

It is apparent that a mechanism similar to that employed in typewriters could be utilized in place of that disclosed in Figs. 5 and 6.

Also, it will be observed that this method of recording is adapted for use in conjunction with teletypewriter systems which employ voice-frequency operated units. In that case the information to be transmitted might be recorded magnetically by a keyboard operation and subsequently transmitted by a magnetic tape transmitter. In such a system each raised pattern must represent a complex wave form comprising more than the two frequencies as discussed hereinabove, and sufficient raised patterns and corresponding frequency combinations must be provided to accommodate each character employed in teletypewriter transmission.

Although specific embodiments of this invention have been shown and described, it will be understood that modifications may be made therein without departing from the scope and spirit thereof as defined by the appended claims.

What is claimed is:

1. The method of recording a representation of a wave form in magnetic material comprising the formation of a raised pattern representing said wave form in a first magnetic material, the placing of said pattern adjacent to and opposite a second magnetic material, and the application of a magnetic field to the two magnetic materials while there is no relative movement between the two, thereby establishing a magnetic representation of said wave form in said second magnetic material.

2. The method of recording a representation of a wave form in magnetic material comprising the formation of a raised pattern representing said wave form in a first magnetic material, the placing of said raised pattern in contact with a second magnetic material, and the application of a magnetic field to the two magnetic materials while in contact and while there is no relative movement between the two, thereby establishing a magnetic representation of said wave form in said second magnetic material.

3. The method of recording a representation of a wave form in magnetic material comprising the formation of a raised pattern representing said wave form in a first magnetic material, the configuration of said raised pattern corresponding in shape and amplitude to the configuration of the wave pattern, the placing of said raised pattern in contact with a second magnetic material, and the application of a magnetic field to the two magnetic materials while in contact and while there is no relative movement between the two, thereby establishing a magnetic representation of said wave form in said second magnetic material.

4. The method of recording representations of alternating current signals in magnetic material comprising the formation of a raised pattern representing said signals in a first magnetic material, the placing of said raised pattern in contact with a second magnetic material, and the application of a magnetic field to the two magnetic materials while in contact and while there is no relative movement between the two, thereby establishing a magnetic representation of said alternating current signals in said second magnetic material.

5. A magnetic recorder comprising a first magnetic material containing a raised pattern representing the wave form to be recorded, a second magnetic material placed adjacent to and opposite said pattern, and means adapted to apply a magnetic field to the two magnetic materials while there is no relative movement between the two.

6. A magnetic recorder comprising a first magnetic material containing a raised pattern representing the wave form to be recorded, a second magnetic material placed in contact with said raised pattern, and means adapted to apply a magnetic field to said magnetic materials while there is no relative movement between the two.

7. A magnetic recorder comprising a first magnetic material containing a raised pattern representing the wave form to be recorded, a second magnetic material, means adapted to place said second magnetic material in contact with said raised pattern, and means adapted to apply a magnetic field to said first and second magnetic materials while there is no relative movement between the two, thereby establishing a magnetic representation of said wave form in said second magnetic material.

8. The combination of a relay and a magnetic recorder comprising a relay, a first magnetic material containing a raised pattern representing the wave form to be recorded, said first magnetic material being attached to the armature of said relay, a second magnetic material, means adapted to clamp said second magnetic material between said raised pattern and the pole-piece of said relay each time the winding of said relay is energized, thereby establishing a magnetic representation of said wave form in said second magnetic material while there is no relative movement between the two materials, and means adapted to present a different area of said second magnetic material for each magnetic representation.

9. The combination of a relay and a magnetic recorder comprising a relay, a first magnetic material containing a raised pattern representing the wave form to be recorded, said first magnetic material being attached to the pole-piece of said relay, a second magnetic material, means adapted to clamp said second magnetic material between said raised pattern and the armature of said relay each time the winding of said relay is energized, thereby establishing a magnetic representation of said wave form in said second magnetic material while there is no relative movement between the two materials, and means adapted to present a different area of said second magnetic material for each magnetic representation.

10. A magnetic recorder for recording successive operations of a device which comprises a device, means for operating and restoring said device at intervals, a medium of ferromagnetic material, a ferromagnetic element, means operable incident to each operation of said device to position said element against a zone of said medium, means operable incident to each such positioning to establish a magnetic field between said element and said zone of said medium, and means operable incident to each restoration of said device to advance said medium to present a new zone for the next operation.

PAUL B. MURPHY.

REFERENCES CITED

The following references are of record in the file of this patent:

UNITED STATES PATENTS

| Number | Name | Date |
|---|---|---|
| 341,287 | Tainter | May 4, 1886 |
| 934,600 | Fuller | Sept. 21, 1909 |
| 1,940,274 | Severy | Dec. 19, 1933 |
| 2,416,090 | De Forest | Feb. 18, 1947 |